United States Patent [19]

Ogura

[11] Patent Number: 4,905,264
[45] Date of Patent: Feb. 27, 1990

[54] METHOD AND SYSTEM FOR DISPLAYING FLICKERLESS X-RAY DYNAMIC IMAGES

[75] Inventor: Ichiro Ogura, Ootawara, Japan

[73] Assignee: Kabushiki Kaisha Toshiba, Kawasaki, Japan

[21] Appl. No.: 219,368

[22] Filed: Jul. 15, 1988

[30] Foreign Application Priority Data

Jul. 16, 1987 [JP] Japan .................................. 62-175844

[51] Int. Cl.⁴ .............................................. H05G 1/64
[52] U.S. Cl. ........................................ 378/99; 358/111
[58] Field of Search ............................ 378/99; 358/111

[56] References Cited

U.S. PATENT DOCUMENTS

| | | | |
|---|---|---|---|
| 4,017,679 | 4/1977 | Kemner et al. | 358/111 |
| 4,628,355 | 12/1986 | Ogura et al. | |
| 4,636,850 | 1/1987 | Stewart | 358/111 |
| 4,658,412 | 4/1987 | Finkler et al. | 378/99 |

FOREIGN PATENT DOCUMENTS 0211608 2/1987 European Pat. Off. .

*Primary Examiner*—Craig E. Church
*Attorney, Agent, or Firm*—Oblon, Spivak, McClelland, Maier & Neustadt

[57] ABSTRACT

In an X-ray cinecamera apparatus with a TV camera, an X-ray tube for radiating X-rays to subject and cinecamera are operated by a controller in a desired timing differing from TV synchronous signals. After video signals output from a TV camera during an odd field period (or even field period) are written into field memory, both the video signals stored in field memory and the video signals output from TV camera during a continued even field period (or continued odd field period) are processed by the adder to a desired brightness level. As a result, flickerless X-ray dynamic images can be displayed on TV monitor.

4 Claims, 7 Drawing Sheets

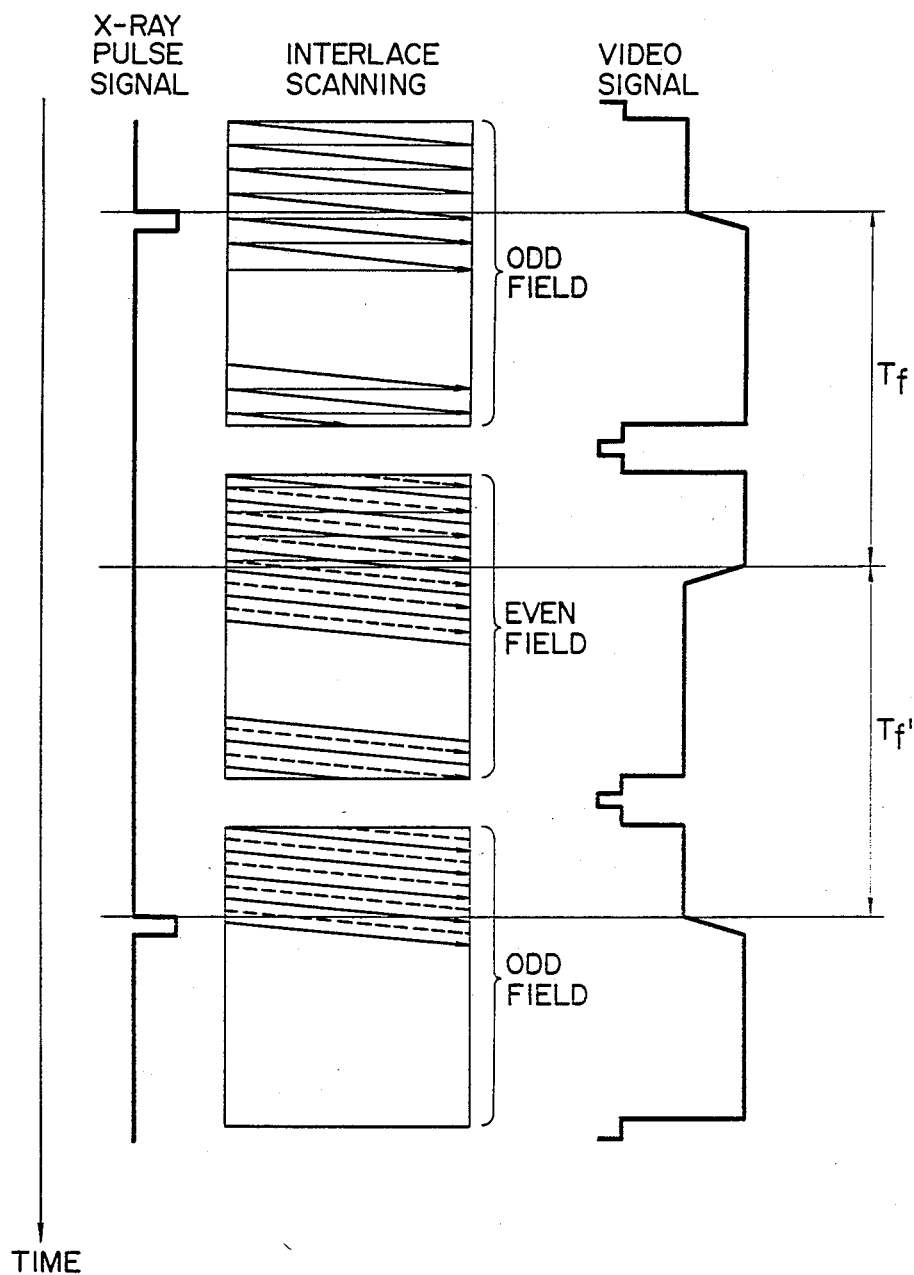
F I G. 1

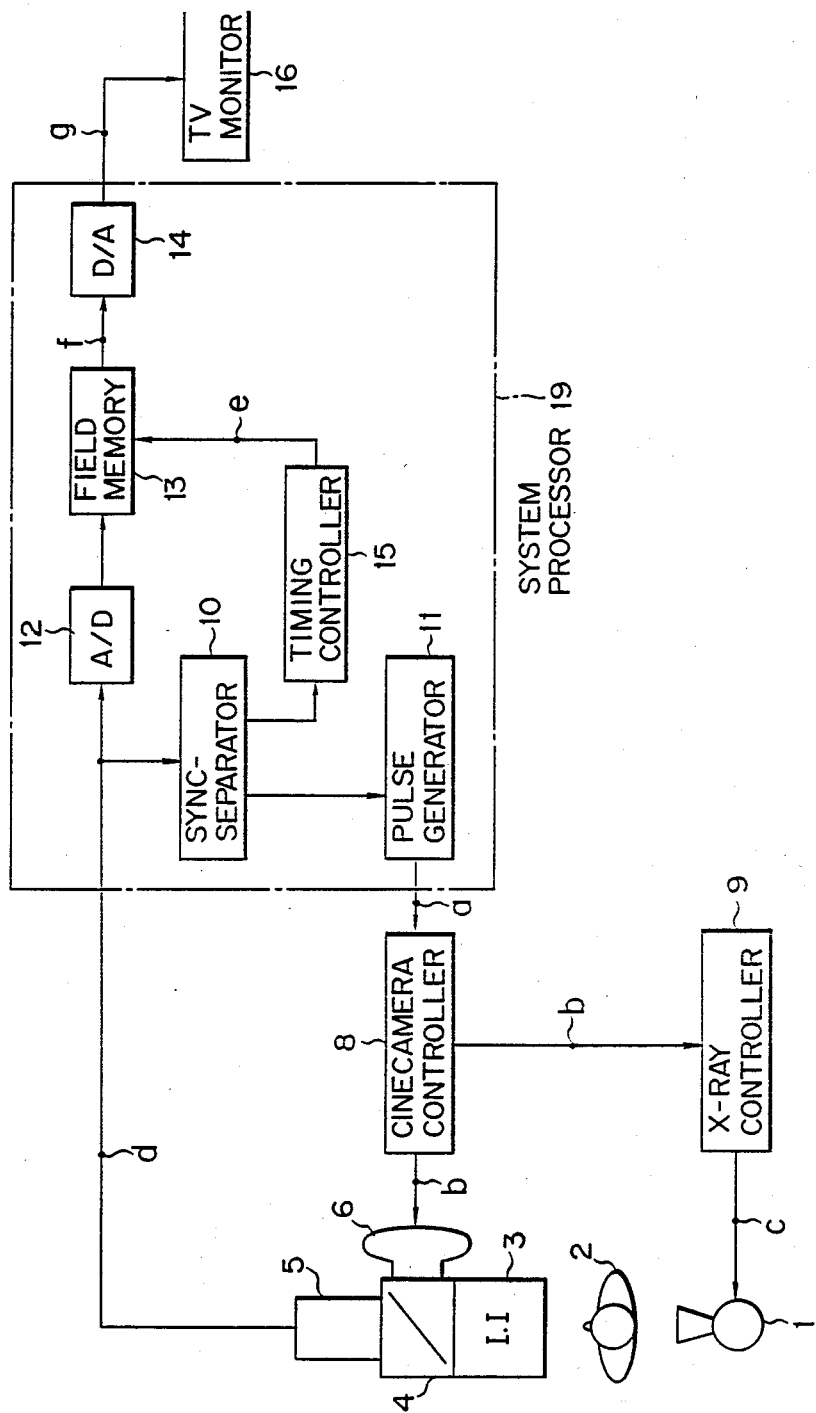
F I G. 2

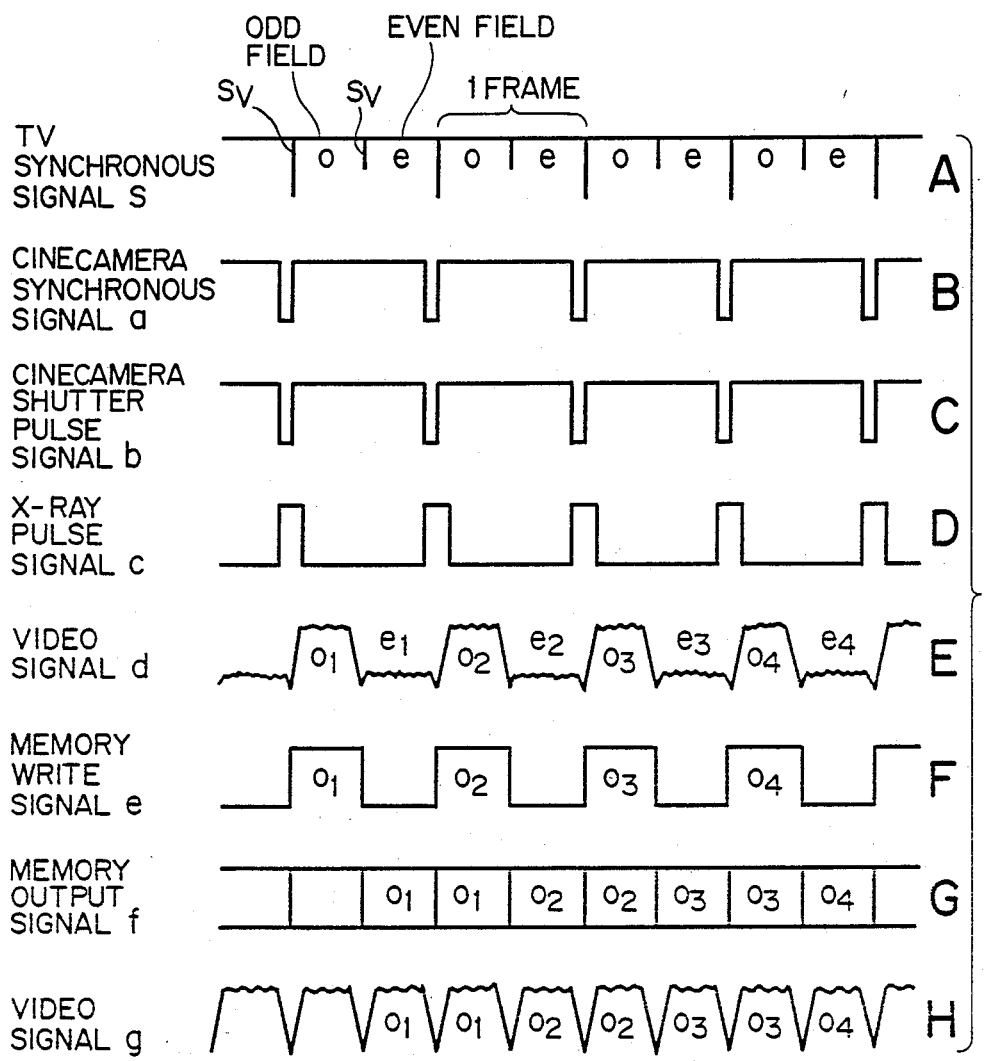
F I G. 3

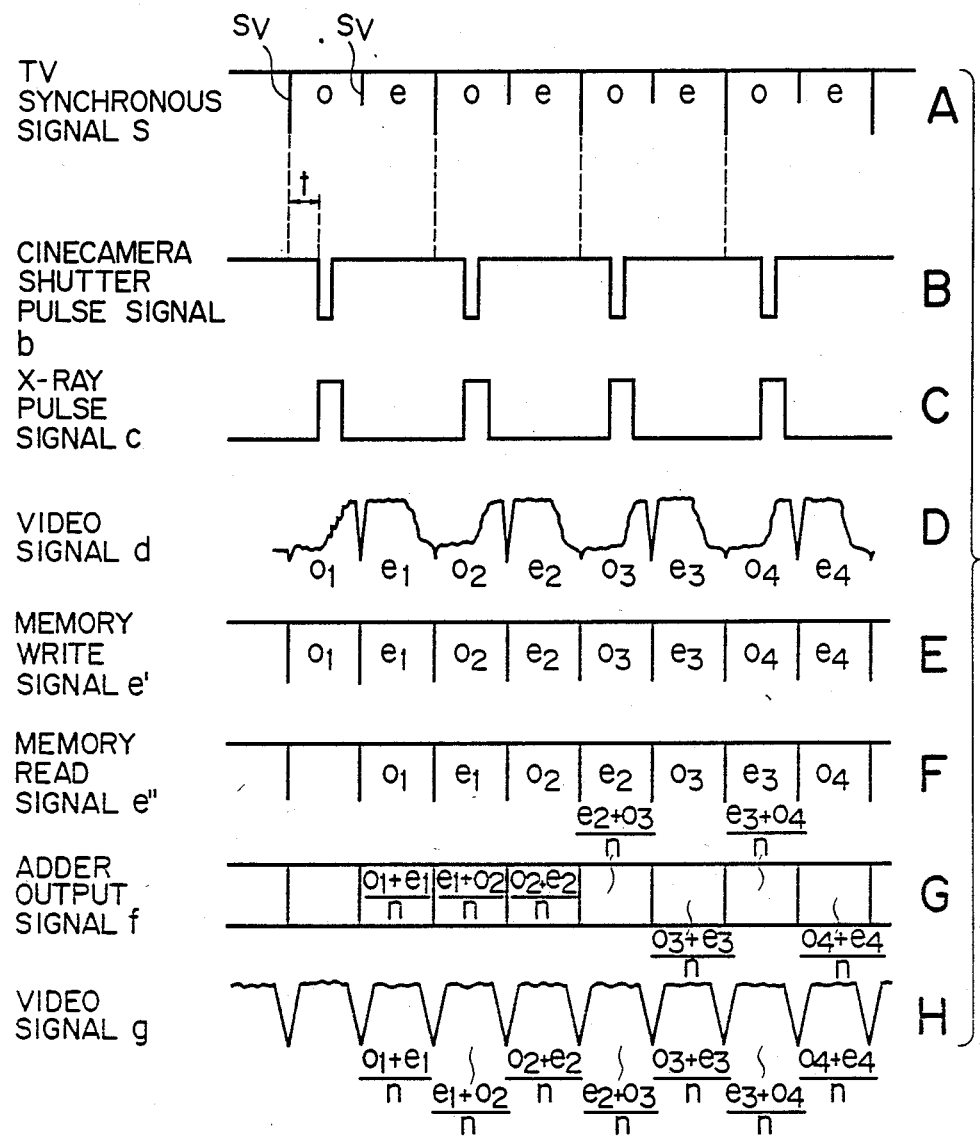
F I G. 5

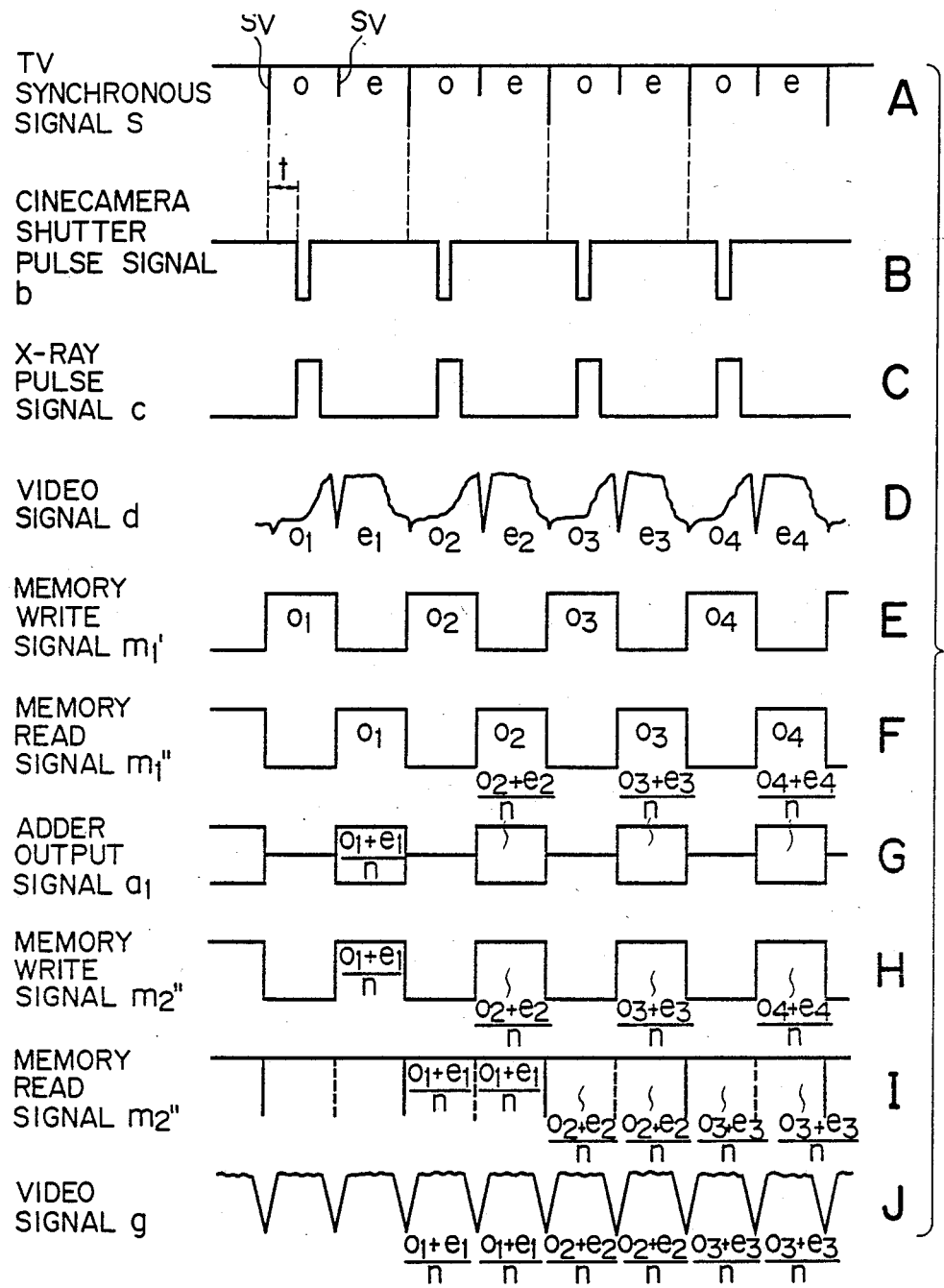
F I G. 7

METHOD AND SYSTEM FOR DISPLAYING FLICKERLESS X-RAY DYNAMIC IMAGES

BACKGROUND OF THE INVENTION

1. Field of the Invention

The present invention relates to a method and system for displaying flickerless X-ray dynamic images in TV camera photography simultaneously performed with cinecamera photography.

2. Description of the Related Art

A conventional apparatus for simultaneously photographing an X-ray image of an object by both a cinecamera and a TV camera is used in circulatory organ diagnosis systems and the like. The number of fields used in TV-camera photography is standardized at 60 fields/sec (the numbers of odd and even field periods). However, the number of fields in cinecamera photography can be arbitrarily determined; current trend has shifted this number from 60 fields/sec to 30 fields/sec. For example, when the number of fields in the cinecamera photography is the same as that in the TV-camera photography, i.e., 60 fields/sec, one X-ray radiation (synchronized with the cinecamera) is performed during one field period without synchronizing the photography timing of the cinecamera with that of the TV camera. Therefore, the brightness levels of the odd and even field periods included in one frame of a video signal are identical, thus displaying excellent X-ray images on a TV monitor.

On the other hand when the number of field in the cinecamera is set at 30 fields/sec, since only one X-ray is radiated during one frame, a video signal including two field periods (the odd and even field periods) each having the same brightness level cannot be obtained. For example, as shown in FIG. 1, the video signal having a high brightness level is detected during first one field period Tf. However, during the next one field period Tf', since interlaced scanning is performed between scanning lines scanned in first period Tf, the video signal having a low brightness level is detected. More specifically, since the video signal detected in accordance with the scanning in first period Tf includes the video signal detected in accordance with the scanning in next field period Tf', the video signal having the low brightness level is detected in the scanning in next field period Tf'. Therefore, a difference between brightness levels occurs, thereby causing flickering of the X-ray images displayed on the TV monitor.

In order to eliminate the above disadvantage, as shown in FIG. 2, an X-ray cinecamera apparatus for operating the cinecamera in synchronism with a TV synchronous signal and displaying the X-ray images in accordance with pseudo interlaced scanning is used. Referring to FIG. 2, X-ray tube 1 radiates an X-ray to subject 2. The X-ray received through subject 2 is converted into light by image intensifier (I.I) 3; this light is incident on optical system 4. The X-ray image of subject 2 is formed by the light incident on optical system 4. The formed X-ray image is photographed by TV camera 5 and cinecamera 6. Note that TV camera 5 includes a camera control unit (not shown) for controlling the TV camera 5.

A video signal output from TV camera 5 is input to sync-separator 10 in system processor 19. Syncseparator 10 separates TV synchronous signal S from the input video signal, as shown in FIG. 3A. TV synchronous signal S includes vertical synchronous signal $S_V$ which separates one frame from the next. Each frame consists of an odd field period (represented by "o") and an even field period (represented by "e"). The video signal output from the TV camera 5 s converted into a digital signal by A/D converter 12 and stored in field memory 13. The video signal read out from field memory 13 is converted into an analog signal by D/A converter 14 and output to TV monitor 16.

Vertical synchronous signal $S_V$ separated by sync-separator 10 is input to timing controller 15. Timing controller 15 comprises, e.g., a pulse generator, and the like, and it controls timings for writing and reading the video signal with respect to field memory 13. Vertical synchronous signal $S_V$ separated by syncseparator 10 is also input to pulse generator 11. Pulse generator 11 outputs cinecamera synchronous signal a synchronized with vertical synchronous signal $S_V$ to cinecamera controller 8 (FIG. 3B). Cinecamera controller 8 controls the timing of X-ray radiation from X-ray tube 1 and an operation of cinecamera 6. Note that X-ray tube 1 is controlled by X-ray controller 9.

Cinecamera synchronous signal a is generated by pulse generator 11 every from in synchronism with vertical synchronous signal $S_V$ separated by syncseparator 10, and is input to cinecamera controller 8. Cinecamera controller 8 generates cinecamera shutter pulse signal b in response to cinecamera synchronous signal a (FIG. 3C) and outputs signal b to X-ray controller 9 and cinecamera 6. X-ray controller 9 generates X-ray pulse signal c at this timing (FIG. 3D) and outputs signal c to X-ray tube 1. Therefore, X-ray tube 1 radiates X-ray to subject 2. Note that since the number of frames in photography of cinecamera 6 is set at 30 frames/sec, X-ray tube 1 radiates the x-ray every 1/30 sec.

When the X-ray is radiated from X-ray tube 1, TV camera 5 with the same timing as above scans for the odd field period for 1/60 sec and outputs video signal d having a waveform such as "o1" for 1/60 sec (FIG. 3E). Then, scanning of the even field period is performed. In this case, since the X-ray is not radiated from X-ray tube 1, TV camera 5 outputs video signal d having a waveform such as "e1" for 1/60 sec (FIG. 3E). Only video signal d, having a waveform such as "o1" output from TV camera 5, is written into field memory 13 in response to memory write signal e with the same timing as vertical synchronous sigal $S_V$, i.e., for 1/60 sec (FIG. 3F).

Video signal d, written into field memory 13, is continuously read out therefrom in response to memory output signal f during the next even and odd field periods (FIG. 3G). One-frame video signal g is input to TV monitor 16 during these even and odd field periods (FIG. 3H). Therefore, since the video signal is output during one frame including the odd and even field periods, pseudo interlaced scanning is performed, thereby displaying flickerless X-ray images on TV monitor 16.

As described above, since the conventional X-ray cinecamera apparatus must operate the cinecamera in synchronism with the TV synchronous signal, the syncronization system is complicated and the apparatus is expensive.

As has been described above, the apparatus for displaying flickerless X-ray images without the synchronization system of the TV camera and the cinecamera has been desired.

SUMMARY OF THE INVENTION

It is an object of the present invention to provide a method and system for displaying flickerless X-ray images on the TV monitor without a system for operating a TV camera and cinecamera in synchronism with each other.

According to one aspect of the present invention, there is provided a method for displaying flickerless X-ray dynamic images, the method comprising the steps of: acquiring first X-ray image signals during a first field period of a frame of an X-ray image; storing the first X-ray image signals acquired during the first field period of the frame of the X-ray image; reading out the stored first X-ray image signals; obtaining third X-ray image signals by processing the read out first X-ray image signals and second X-ray image signals acquired during a second field period to yield a desired brightness level; and displaying X-ray images in accordance with the obtained third X-ray image signals.

According to another aspect of the present invention, there is provided a system for displaying flickerless X-ray dynamic images, the system comprising: acquiring means for acquiring first X-ray image signals during a first field period of a frame of an X-ray image; storing means for storing the first X-ray image signals acquired by the acquiring means during the first field period of the frame of the X-ray image; control means for controlling an access timing for the storing means; obtaining means for obtaining third X-ray image signals by processing the first X-ray image signals read out from the storing means controlled by the control means and second X-ray image signals acquired by the acquiring means during a second field period to yield a desired brightness level; and displaying means for displaying X-ray images in accordance with the third X-ray image signals obtained by the obtaining means.

BRIEF DESCRIPTION OF THE DRAWINGS

FIG. 1 is a timing chart of X-ray pulse and interlaced scanning signals;

FIG. 2 is a block diagram showing an arrangement of a conventional X-ray cinecamera system;

FIGS. 3A to 3H are timing charts of an operation of the conventional X-ray cinecamera system;

FIGS. 5A to 5H are timing charts of an operation of the system according to the first embodiment of the present invention;

FIGS. 7A to 7J are timing charts of an operation of the system according to the second embodiment of the present invention.

DETAILED DESCRIPTION OF THE PREFERRED EMBODIMENTS

An embodiment of the present invention will be described with reference to the accompanying drawings.

Figure 4:
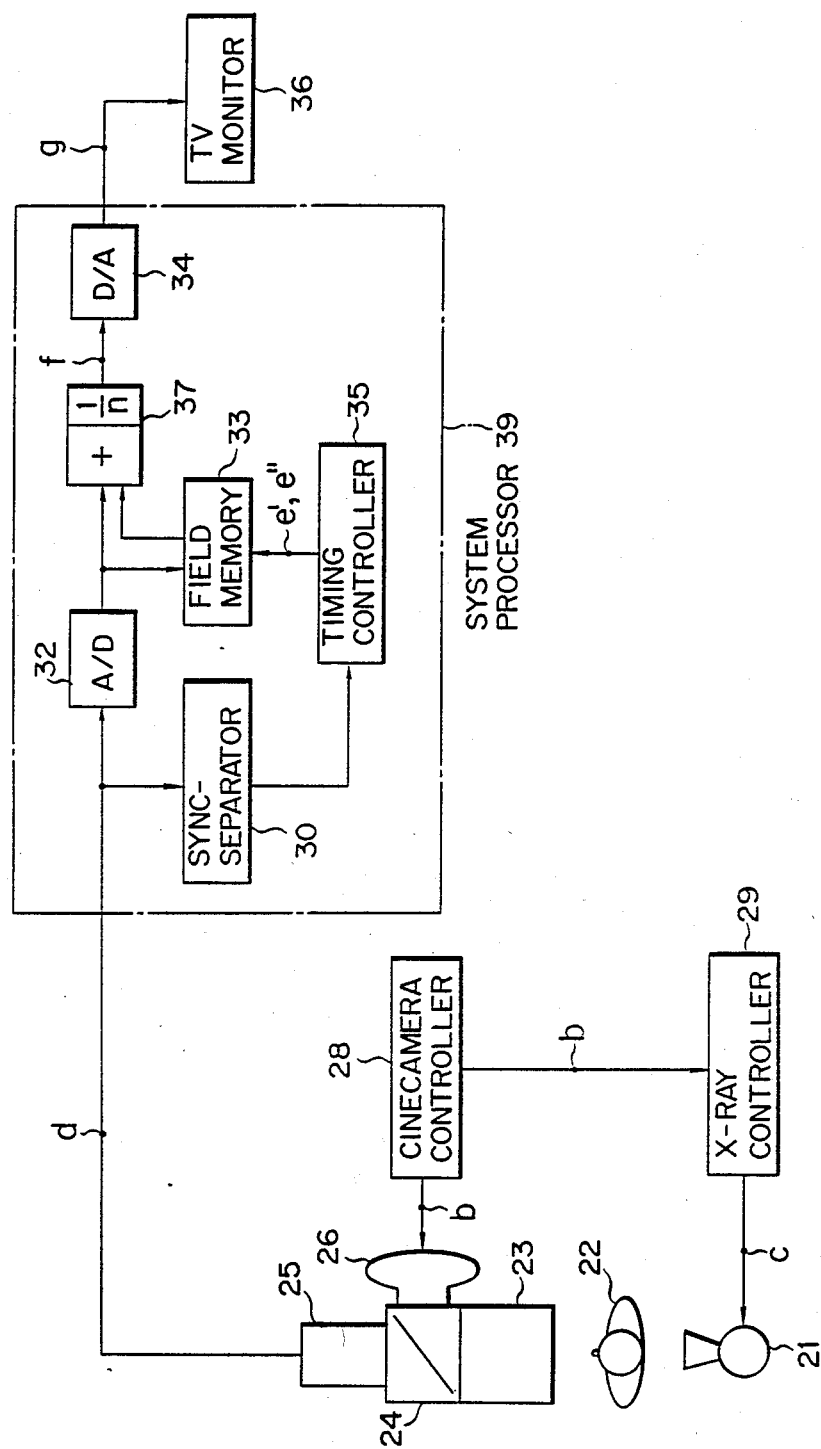
FIG. 4 is a block diagram showing an arrangement of a system according to a first embodiment of the present invention.

A first embodiment system shown in FIG. 4 includes X-ray tube 21, object 22 to be examined, image intensifier 23, optical system 24, TV camera 25, cinecamera 26, cinecamera controller 28, X-ray controller 29, sync-separator 30, A/D converter 32, field memory 33, D/A converter 34, timing controller 35, and TV monitor 36.

This arrangement shown in FIG. 4 is the same as the conventional system.

Adder 37 in system processor 39 adds a signal read out from field memory 33 to a signal directly output from A/D converter 32 and divides the added result by predetermined value n, thereby obtaining a predetermined brightness level. Predetermined value n is determined in accordance with a required signal level, i.e., a brightness level of a video signal displayed on TV monitor 36.

Operation of the first embodiment system will be described below with reference to timing charts in FIGS. 5A to 5H.

Referring to FIGS. 5A to 5H, cinecamera shutter pulse signal b is generated, but its timing is not synchronized with TV synchronous signal S, e.g., the timing of pulse signal b as compared to the timing of signal s is delayed by time interval t. X-ray pulse signal c is generated in synchronism with cinecamera shutter pulse signal b. Therefore, video signal d having a waveform including components 01, e1, o2, e2, and the like is generated. As described above, the video signal having a high brightness level is detected during a period corresponding to one field after X-ray radiation. However, the video signal having a low brightness level is detected during a period corresponding to the next one field. After 1/30 sec (the period corresponding to the above two fields), the same operations are repeated. During the odd field period component o1 included in video signal d is written into field memory 33 in response to memory write signal e. Component e1 included in video signal d is written into field memory 33 in response to memory write signal e' during the next even field period. The same operations are repeated in each frame.

Component o1 included in video signal d is read out from field memory 33 in response to memory read signal e" during the above even field period, and component e1 included in video signal d is read out in response to memory read signal e'" during the odd field period in the next frame. The same operations are repeated. Read out component o1 included in video signal d is input to adder 37 and added to component e1 in the video signal d directly input to adder 37 from A/D converter 32 during the same period as o1, i.e., the even field period. At the same time, a division (o1+e1)/n is performed by adder 37, and signal f having a predetermined brightness level is output. The same operations are repeated after the next field period. Subsequently, the video signal having a brightness level corresponding to (o1+e1)/n during the even field period and the video signal having a brightness level corresponding to (e1+o2)/n during the odd field period in the next frame are respectively output so as to constitute one frame. These video signals are converted into analog signals by D/A converter 34 and input to TV monitor 36 as video signal g.

According to this embodiment, as has been described above, the video signals respectively obtained during the even and odd field periods are added to each other, so that the image signal corresponding to one frame is generated, thereby obtaining a video signal having the same brightness level. Therefore, flickerless X-ray images are realized. In addition, the synchronization system of the TV camera and cinecamera is not necessary, thus realizing a low cost system.

Figure 6:
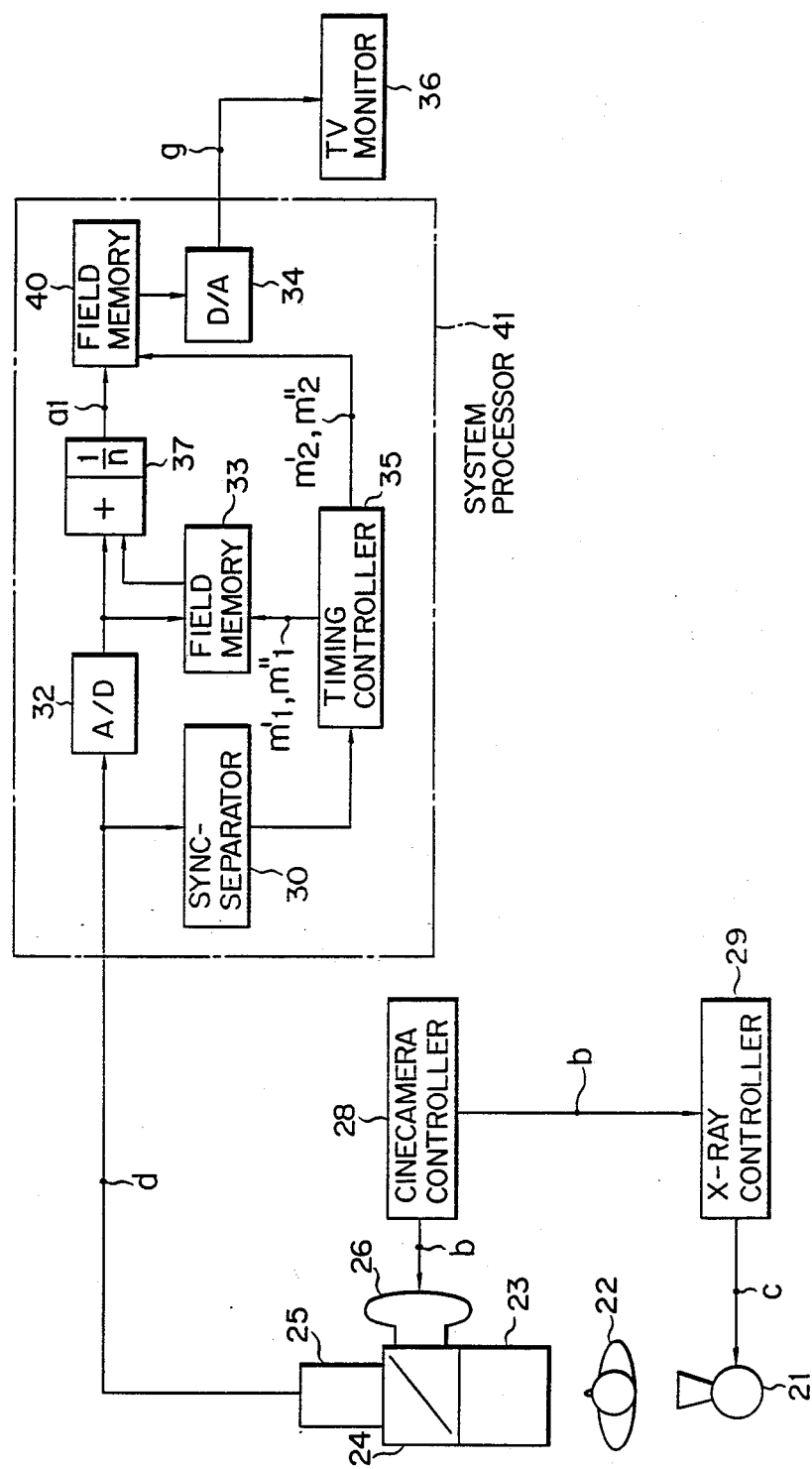
FIG. 6 is a block diagram showing an arrangement of a system according to a second embodiment of the present invention.

FIG. 6 is a block diagram showing an arrangement of a second embodiment system of the present invention.

Field memory 40 is arranged between adder 37 and D/A converter 34 in system controller 41 in FIG. 6, unlike the arrangement of the system in FIG. 4. With this arrangement, the video signal output from adder 37 is written in field memory 40 during the current field period and read out from field memory 40 during the next field period.

Operation of the second embodiment system will be described below with reference to timing charts in FIGS. 7A to 7J.

Component o1 included in video signal d is written into field memory 33 in response to memory write signal m1' during an odd field period an read out from field memory 33 in response to memory read signal m1" during and even field period. The same operations are repeated. Read out component o1 is added to component e1 included in video signal d output form A/D converter 32 by adder 37 during the even field period and processed so as to be adder output signal a1 having a predetermined brightness level. The same operations are repeated after the next even field period.

Adder output signal a1 output from adder 37 is written into field memory 40 in response to memory write signal m2' during the even field period and read out from field memory 40 in response to memory read signal m2" during the odd field period in the next frame. The same operations are repeated after the next frame. Signal a1 is read out twice during the odd field period and the continued even field period, so that video signal g corresponding to signal a1 constitutes one frame and is input to TV monitor 36.

As described above, the image signals of the odd and even field periods are added, so that an image signal including field periods having the same brightness level can be obtained. Therefore, since pseudo interlaced scanning is performed, the same operation and effect in the first embodiment system can be obtained.

In the embodiments described above, the image signals of the field periods adjacent to each other are added, so that the image signals having the same brightness level can be obtained, thereby displaying flickerless X-ray dynamic images. Therefore, more accurate observation of the X-ray images is allowed and diagnostic performance can be improved. Note that even if the odd and even field periods are replaced by each other, the same operation and effect can be obtained.

Although the embodiments of the present invention have been described above, the invention is not limited to the above embodiments, and various changes and modifications may be made within the spirit and scope of the invention.

What is claimed is:

1. A method for displaying X-ray dynamic images, the method comprising the steps of:
    acquiring a first X-ray image signal during a first field period of a frame corresponding to an X-ray image;
    storing the acquired first X-ray image signal during the first field period;
    reading out the stored first X-ray image signal during a second field period of the frame corresponding to the X-ray image;
    acquiring a second X-ray image signal during the second field period;
    obtaining a third X-ray image signal by adding the read out first X-ray image signal to the acquired second X-ray image signal during the second field period; and
    displaying the X-ray image in accordance with the obtained third X-ray image signal.

2. A method according to claim 1, wherein the obtaining step includes the step of dividing the third X-ray image signal by a desired value.

3. A system for displaying X-ray dynamic images, the system comprising:
    acquiring means for acquiring a first X-ray image signal during a first field period of a frame corresponding to an X-ray image, and a second X-ray image signal during a second field period of the frame corresponding to the X-ray image;
    storing means for storing the acquired first X-ray image signal during the first field period;
    control means for controlling an access timing for the storing means;
    obtaining means for obtaining a third X-ray image signal by adding the first X-ray image signal read out from the storing means by the control means to the second X-ray image signal acquired by the acquiring means; and
    displaying means for displaying the X-ray image in accordance with the third X-ray signal obtained by the obtaining means.

4. A system according to claim 3, wherein the obtaining means includes means for dividing the third X-ray image signal added by the adding by a desired value.

* * * * *